United States Patent
Tamura

(10) Patent No.: US 8,103,210 B2
(45) Date of Patent: Jan. 24, 2012

(54) INFORMATION PROCESSING APPARATUS

(75) Inventor: Toshiya Tamura, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 247 days.

(21) Appl. No.: 12/644,469

(22) Filed: Dec. 22, 2009

(65) Prior Publication Data

US 2010/0167821 A1  Jul. 1, 2010

(30) Foreign Application Priority Data

Dec. 26, 2008 (JP) ................. P2008-333448

(51) Int. Cl.
*H04H 60/09* (2008.01)

(52) U.S. Cl. ............. 455/3.04; 455/3.05; 455/3.06; 455/418; 455/419; 455/420; 455/41.2; 455/41.3; 455/556.1; 455/569.1; 455/569.2

(58) Field of Classification Search ......... 455/418, 455/419, 420, 41.2, 41.3, 556.1, 556.2, 569.1, 455/569.2, 575.2, 90.1–90.2, 3.01, 3.04, 455/3.05, 3.06
See application file for complete search history.

(56) References Cited

U.S. PATENT DOCUMENTS

| | | | | |
|---|---|---|---|---|
| 7,369,532 | B2* | 5/2008 | Silvester | 370/349 |
| 7,627,289 | B2* | 12/2009 | Huddart | 455/41.2 |
| 8,006,002 | B2* | 8/2011 | Kalayjian et al. | 710/36 |
| 2002/0068610 | A1* | 6/2002 | Anvekar et al. | 455/560 |
| 2002/0098878 | A1* | 7/2002 | Mooney et al. | 455/569 |
| 2003/0161292 | A1* | 8/2003 | Silvester | 370/349 |
| 2004/0209569 | A1* | 10/2004 | Heinonen et al. | 455/41.2 |
| 2006/0212938 | A1* | 9/2006 | Suzuki | 726/16 |
| 2008/0146290 | A1* | 6/2008 | Sreeram et al. | 455/569.1 |
| 2009/0215398 | A1* | 8/2009 | Adler et al. | 455/41.3 |

OTHER PUBLICATIONS

Audio/Video Remote Control Profile v1.4 (Bluetooth SIG); Jun. 26, 2008: pp. 66-67.

* cited by examiner

*Primary Examiner* — Tuan A Tran
(74) *Attorney, Agent, or Firm* — Maschoff Gilmore & Israelsen

(57) ABSTRACT

An information processing apparatus includes a short-distance wireless communication unit and a player selection controller. The short-distance wireless communication unit receives, from a partner device via short-distance wireless communication, a selection request to select any one of players. In accordance with the selection request, the player selection controller controls switching to a player requested to be selected. After start of the player switching, when a predetermined time elapses before success or failure of the player switching is determined, the short-distance wireless communication unit transmits, to the partner device via short-distance wireless communication, a selection success response to the selection request. After the transmission of the selection success response, when failure of the player switching is detected, the short-distance wireless communication unit transmits, to the partner device via short-distance wireless communication, a player change notification indicating a change into a player selected before execution of the player switching.

15 Claims, 5 Drawing Sheets

INFORMATION PROCESSING APPARATUS

CROSS-REFERENCE TO RELATED APPLICATION

This application is based upon and claims the benefit of priority from the prior Japanese Patent Application No. 2008-333448 filed on Dec. 26, 2008; the entire contents of which is incorporated herein by reference.

BACKGROUND OF THE INVENTION

1. Field of the Invention

The present invention relates to information processing apparatuses, and particularly to an information processing apparatus including a media player which can be controlled with a remote control of a partner device.

2. Description of the Related Art

In recent years, mobile phones have begun to provide multimedia functions including a music control function that allows listening to audio data and a function that allows reception of digital terrestrial broadcasting, as well as a voice communication function, an address book function, an electronic mail function via a base station and a network such as the Internet, and a browser function that allows viewing of Web pages.

The Bluetooth (registered trademark) standard is known as wireless communication technology applicable to electronic devices, Using the Bluetooth standard as wireless communication technology allows transfer of audio data from a mobile phone to a partner device (an electronic device), such as a headset or an in-vehicle device, without use of audio cables.

As profiles for transmission of audio data, "Advanced Audio Distribution Profile (A2DP)" and "Generic Audio/Video Distribution Profile" are known. These are standards for performing streaming transfer of audio data in real time between devices connected via the Bluetooth standard.

Additionally, technology related to an AV remote control service has been proposed. For example, if audio data is transferred from a mobile phone to a partner device via the Bluetooth standard, the AV remote control service controls transfer, playback, and stop of the audio data by transmitting a command to the mobile phone using a remote control included in the partner device. The specification of the technology related to the AV remote control service is defined by the Audio/video Remote Control Profile (AVRCP) standard.

The AVRCP defines a packet format for AV remote control commands. The specification of the AVRCP has been upgraded from the AVRCP v1.3 to the AVRCP v1.4 (Bluetooth SIG). The AVRCP v1.4 defines a general procedure in which a mobile phone having a music player is controlled from a partner device with a remote control command. However, the AVRCP v1.4 does not define procedures appropriate for all practical situations.

SUMMARY OF THE INVENTION

The AVRCP v1.4 defines additional functions, such as selecting a plurality of players (e.g., a music player and a digital terrestrial one-segment player) included in a mobile phone, and giving instructions to obtain a playlist and music information for each player and to play back music. The AVRCP v1.4 defines that if a mobile phone receives a remote control command from a partner device, a response (including an intermediate response) is to be returned to the partner device within a predetermined period of time after receipt of the remote control command.

However, unlike player devices dedicated to music playback etc., a mobile phone (a cellular phone) is not always capable of activating a music player in response to a remote control command. The mobile phone may not be able to activate the music player, due to conflict with other application programs included in the mobile phone. In such a case, it is difficult for the mobile phone to properly return a response to the partner device within a predetermined period of time after receipt of the remote control command.

The present invention has been made in view of the circumstances described above. An object of the present invention is to provide an information processing apparatus capable of properly transmitting, to a partner device (an electronic device), a response to a player selection request made using a remote control command.

In order to attain the above-mentioned circumstances, an information processing apparatus according to an aspect of the present invention includes: a receiving unit configured to receive, from an electronic device via short-distance wireless communication, a selection request to select any of a plurality of players which the information processing apparatus controls; a player switching control unit configured to control switching to a player requested to be selected, in accordance with the selection request received by the receiving unit; and a selection success response transmitting unit configured to transmit, to the electronic device via short-distance wireless communication, a selection success response to the selection request if after the player switching control unit starts player switching, a predetermined time elapses before success or failure of the player switching is determined.

In order to attain the above-mentioned circumstances, an information processing apparatus according to another aspect of the present invention includes: a receiving unit configured to receive, from a electronic device via short-distance wireless communication, a selection request to select any of a plurality of players which the information processing apparatus controls; a player switching control unit configured to control, if the receiving unit receives a selection request to select a second player of the plurality of players while a first player of the plurality of players is activated, switching to the second player requested to be selected; a selection success response transmitting unit configured to transmit, to the electronic device via short-distance wireless communication, a selection success response indicating success of switching to the second player to the selection request if after the player switching control unit starts switching from the first player to the second player, a predetermined time elapses before success or failure of the switching is detected; and a change notification unit configured to transmit a player change notification to the electronic device via short-distance wireless communication, the player change notification indicating a change into a state where the first player is selected, if failure of the switching to the second player performed by the player switching control unit is detected after the selection success response transmitting unit transmits to the electronic device the selection success response indicating success of the switching to the second player.

In order to attain the above-mentioned circumstances, an information processing apparatus according to another aspect of the present invention includes: a receiving unit configured to receive, from a electronic device via short-distance wireless communication, a selection request to select any of a plurality of players which the information processing apparatus controls; a player switching control unit configured to control switching to a player requested to be selected, in accordance with the selection request received by the receiving unit; a selection success response transmitting unit configured to transmit, to the electronic device via short-distance wireless communication, a selection success response to the selection request if the player switching control unit starts player switching, the selection success response indicating success of the player switching; and a change notification unit configured to transmit a player change notification to the electronic device via short-distance wireless communication, the player change notification indicating a change into a state where a player selected before the player switching control unit controls the player switching is selected, if failure of the player switching performed by the player switching control unit is detected after the selection success response transmitting unit transmits the selection success response to the electronic device.

DETAILED DESCRIPTION OF THE INVENTION

Hereinafter, embodiments of the present invention will be described with reference to the drawings.

Figure 1:
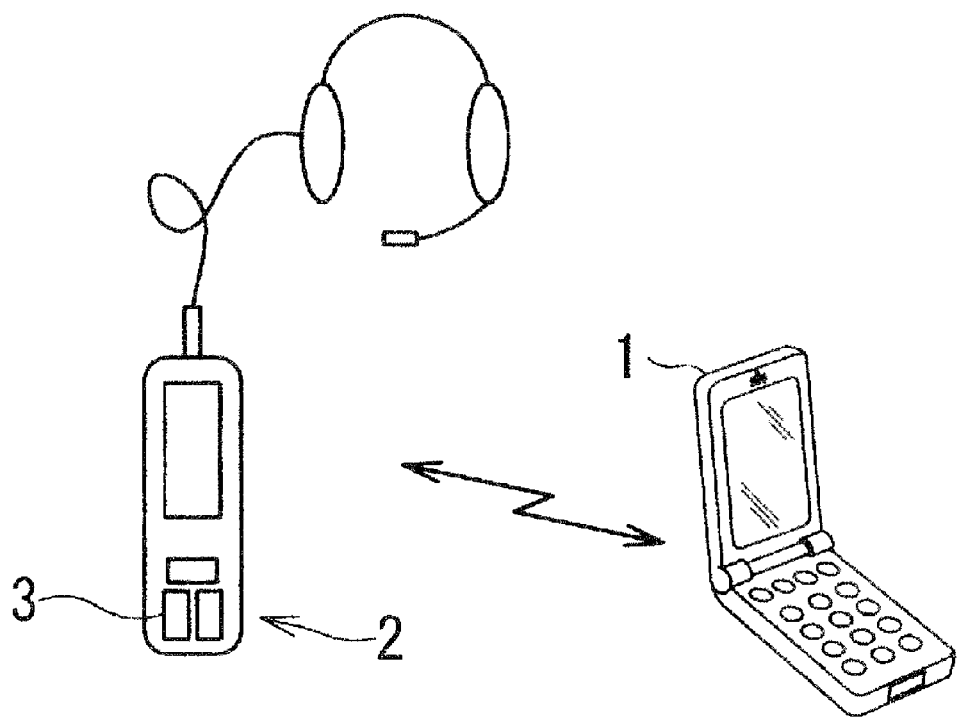
FIG. 1 illustrates an overall configuration of an information transmitting and receiving system according to an embodiment of the present invention.

FIG. 1 illustrates an overall configuration of an information transmitting and receiving system according to an embodiment of the present invention. As illustrated in FIG. 1, a headset 2 serving as a partner device (an electronic device) according to the present invention is placed near a mobile phone (a cellular phone) 1. The headset 2 receives audio data transferred from the mobile phone 1 via wireless communication (e.g., the Bluetooth standard) and can play back (reproduce) the received audio data in approximately real time. The headset 2 includes a remote control 3 with which the mobile phone 1 can be remotely operated via wireless communication. An in-vehicle device, instead of the headset 2, may be used as the partner device.

Figure 2:
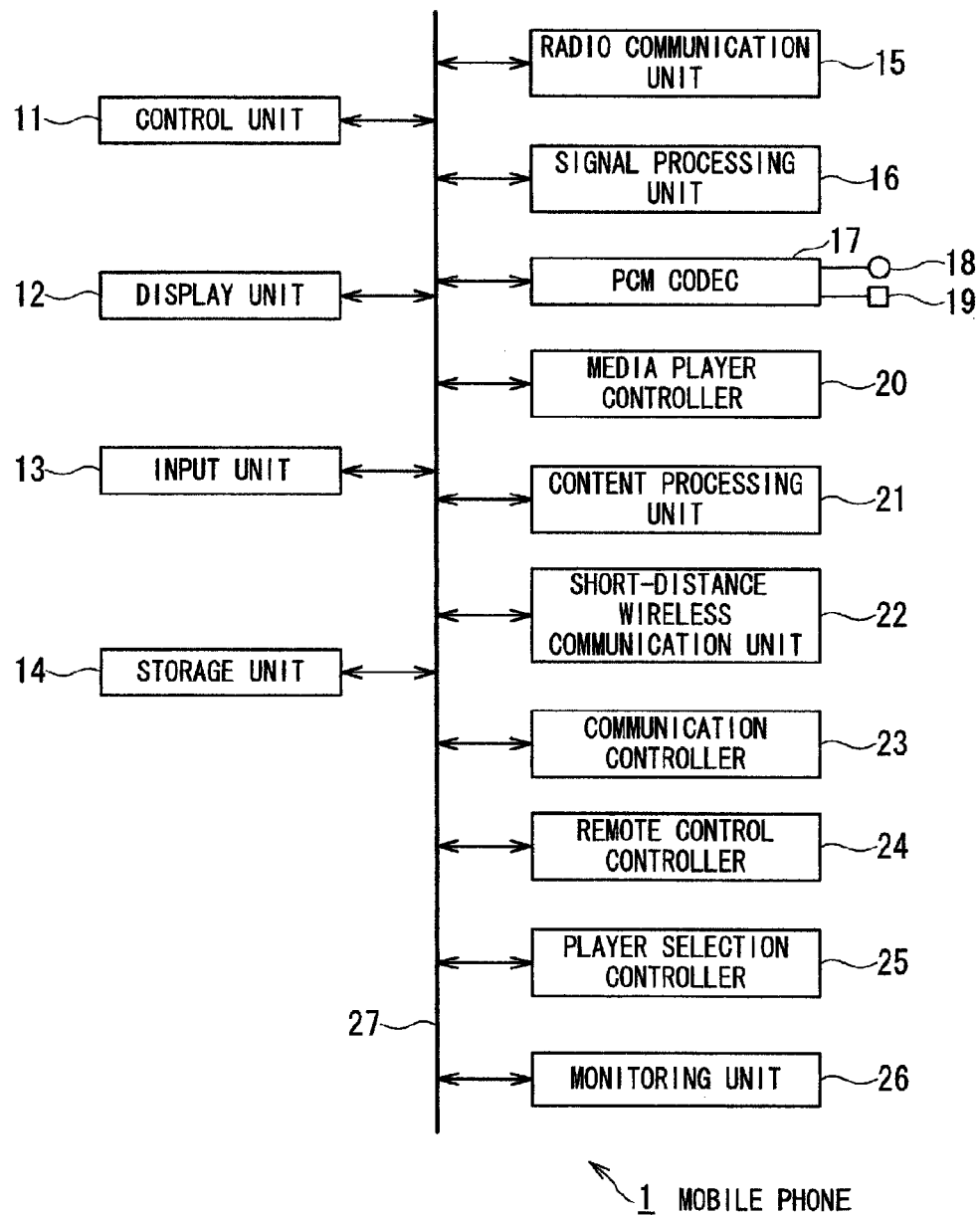
FIG. 2 is a block diagram illustrating an internal configuration of a mobile phone of FIG. 1.

FIG. 2 illustrates an internal configuration of the mobile phone 1. As illustrated in FIG. 2, the mobile phone 1 includes such components as a control unit 11, a display unit 12, an input unit 13, a storage unit 14, a radio communication unit 15, a signal processing unit 16, a PCM codec 17, microphone 18, a speaker 19, a media player controller 20, a content processing unit 21, a short-distance wireless communication unit 22, a communication controller 23, a remote control controller 24, a player selection controller 25, and a monitoring unit 26. These components of the mobile phone 1 are connected to each other via a bus 27.

The control unit 11 includes a central processing unit (CPU), a read only memory (ROM), and a random access memory (RAM). The CPU executes various kinds of processing in accordance with programs stored in the ROM, or various application programs loaded from the storage unit 14 into the RAM. Additionally, the CPU generates various control signals, supplies them to various parts, and thus controls an overall operation of the mobile phone 1. The RAM stores data necessary for the CPU to execute various kinds of processing. The display unit 12 includes, for example, a liquid crystal display (LCD). The input unit 13 includes operation keys and operation buttons.

The radio communication unit 15 receives via an antenna a radio signal transmitted from a base station, and generates an intermediate frequency signal by down-converting the received radio signal. Furthermore, the radio communication unit 15 includes a RAKE receiver and may perform a quadrature demodulation processing, dispreading and synthesis processings for each path from the RAKE receiver. Reception packet data output from the RAKE receiver is input to the signal processing unit 16.

The signal processing unit 16 includes, for example, a digital signal processor (DSP). The signal processing unit 16 separates the reception packet data by medium, and decodes the resulting data for each medium. If the reception packet data contains audio data, the signal processing unit 16 decodes the audio data with a speech codec. If the reception packet data contains moving image data, the signal processing unit 16 decodes the moving image data with a video codec. If the reception packet data is downloaded content, the signal processing unit 16 expands the downloaded content.

A digital audio signal obtained by decoding is PCM-decoded by the PCM codec 17, amplified, and output from the speaker 19. A digital moving image signal decoded by the video codec is supplied via the bus 27 to the display unit 12 and displayed.

The media player controller 20 controls, for example, a music player having a music control function. The mobile phone 1 includes a digital terrestrial one-segment radio receiver. The media player controller 20 controls a digital terrestrial one-segment player realized by executing an application program for receiving digital terrestrial one-segment broadcasting.

For example, if the media player controller 20 controls a music player, the content processing unit 21 temporarily decodes audio data encoded in an encoding format, such as ACC, aacPlus, MP3, ATRAC, or SBC, in a decoding format corresponding to the encoding format, and then re-encodes the decoded data in another encoding format.

The short-distance wireless communication unit 22 includes a module which may perform wireless communication via the Bluetooth standard. The short-distance wireless communication unit 22 wirelessly communicates with the headset 2 near the mobile phone 1. Wireless communications other than the Bluetooth standard (e.g., infrared communication) may be used.

The communication controller 23 controls overall communication performed with the headset 2 through the short-distance wireless communication unit 22. For example, the communication controller 23 uses OBEX software to control overall communication that is performed by the short-distance wireless communication unit 22 in accordance with various profiles. For example, the communication controller 23 generates media packets corresponding to various media players controlled by the media player controller 20 and data encoding formats. Then, the generated media packets are sequentially transmitted through the short-distance wireless communication unit 22 to the headset 2.

Upon receipt of various remote control commands from the remote control 3 on the headset 2 through the short-distance wireless communication unit 22, the remote control controller 24 interprets the received various remote control commands in ways appropriate for respective media players. If the media player is a music player, the remote control controller 24 interprets, for example, which of "play", "pause", "stop", "fastforward", "rewind", "forward", and "backward" is a remote control command received from the headset 2 serving as the partner device, during playback on the media player. The remote control commands received from the headset 2 include a remote control command related to a player selection request for switching to any of the plurality of players controlled by the media player controller 20. In accordance with a result of the interpretation, the remote control controller 24 notifies the media player controller 20 of the start or end of an instruction to change the playback mode of the media player indicated by the received remote control command. Additionally, the remote control controller 24 interprets the remote control command related to the player selection request, and notifies the player selection controller 25 of switching to any of the plurality of players controlled by the media player controller 20. The remote control controller 24 causes the short-distance wireless communication unit 22 to transmit, to the headset 2, a response command generated in accordance with a result of the interpretation.

In accordance with the notification from the remote control controller 24 about the player switching, the player selection controller 25 controls switching to any of the plurality of players controlled by the media player controller 20. The monitoring unit 26 monitors the result of the player switching executed by the player selection controller 25 in accordance with the player selection request. If the mobile phone 1 fails in the player switching, the monitoring unit 26 notifies the remote control controller 24 of the failure of the player switching. Here, the phrase "failure of the player switching" refers to the situation where the player switching cannot be made in accordance with the notification from the remote control controller 24, due to conflict with other application programs in the mobile phone 1, low processing priority, or the like.

Next, with reference to the flowchart of FIG. 3, an audio data transfer process performed in the mobile phone 1 of FIG. 2 will be described. This audio data transfer process is executed if a remote control command related to a player selection request is received from the headset 2 during AVRCP connection between the mobile phone 1 and the headset 2 through the short-distance wireless communication unit 22. FIG. 4 illustrates a processing sequence performed between the mobile phone 1 and the headset 2 during execution of the audio data transfer process described with reference to the flowchart of FIG. 3. As illustrated in FIG. 4, an AVRCP connection is established between the mobile phone 1 and the headset 2 through the short-distance wireless communication unit 22. In FIG. 4, Player A, which is one of the plurality of players controlled by the media player controller 20, is already activated in the mobile phone 1. Player A is a music player. In addition to Player A, Player B is included in the plurality of players controlled by the media player controller 20. Player B is a digital terrestrial one-segment player.

Figure 3:
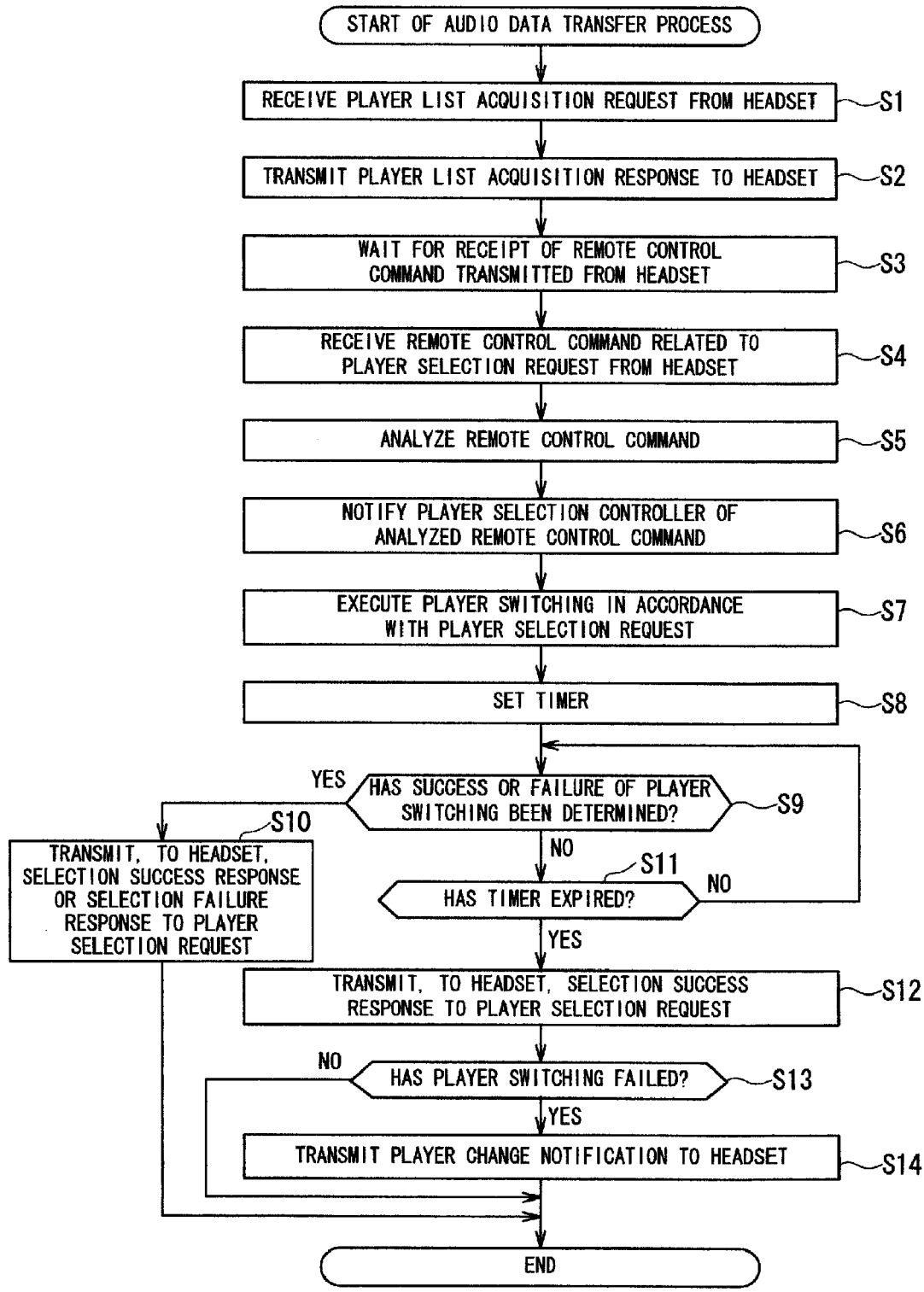
FIG. 3 is a flowchart illustrating an audio data transfer process performed in the mobile phone of FIG. 2.
Figure 4:
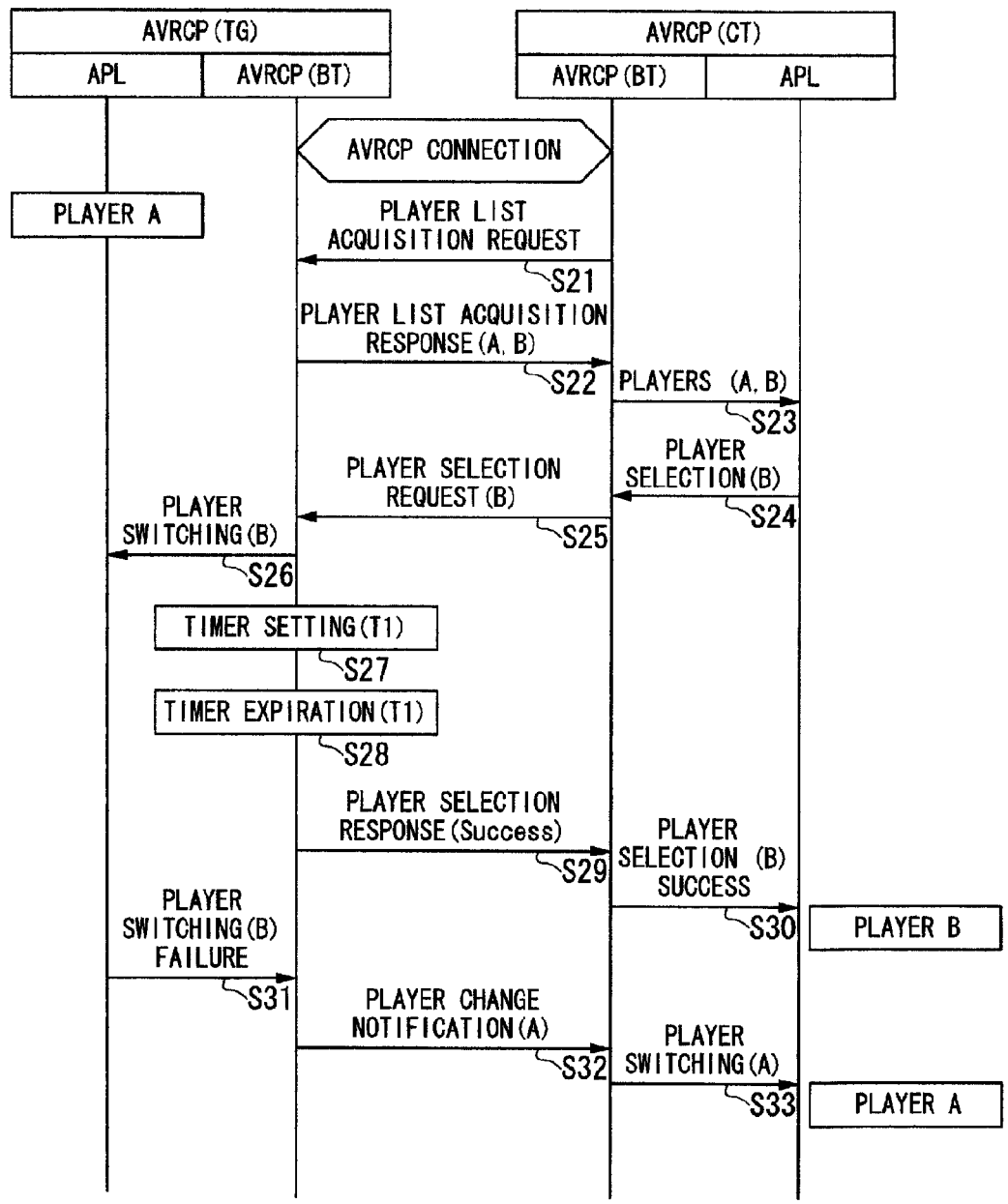
FIG. 4 illustrates a processing sequence performed between the mobile phone and a headset during execution of the audio data transfer process described with reference to FIG. 3.

In step S1 of FIG. 3, the short-distance wireless communication unit 22 receives a player list acquisition request transmitted from the headset 2 serving as the partner device, and supplies the received player list acquisition request to the communication controller 23 (step S21 of FIG. 4). In step S2, the short-distance wireless communication unit 22 transmits a player list acquisition response to the player list acquisition request from the headset 2 (step S22 of FIG. 4). The player list acquisition request includes a player list containing information about the players controlled by the media player controller 20. The headset 2 receives the player list acquisition response from the mobile phone 1 via short-distance wireless communication, executes an application program, and displays information about the players controlled by the media player controller 20 of the mobile phone 1 on the basis of the received player list (step S23 of FIG. 4). In step S3, the short-distance wireless communication unit 22 waits for receipt of a remote control command transmitted from the headset 2.

The user views the player list, displayed on the headset 2, and uses the remote control 3 on the headset 2 to select any (e.g., Player B) of the plurality of players (e.g., Players A and B). The headset 2 executes the application program to accept the selection of Player B, generates a player selection request to select Player B, and supplies a remote control command related to the generated player selection request to a short-distance wireless communication unit of the headset 2 (step S24 of FIG. 4). The short-distance wireless communication unit of the headset 2 transmits, to the mobile phone 1, the remote control command related to the player selection request to select Player B (step S25 of FIG. 4).

In step S4, the short-distance wireless communication unit 22 receives the remote control command related to the player selection request transmitted from the headset 2 serving as the partner device, and supplies the received remote control command through the communication controller 23 to the remote control controller 24 (step S25 of FIG. 4). In step S5, the remote control controller 24 interprets (analyzes) the received remote control command. In step S6, the remote control controller 24 notifies the player selection controller 25 of switching to any of the plurality of players controlled by the media player controller 20. Here, the remote control controller 24 notifies the player selection controller 25 of switching from Player A to Player B controlled by the media player controller 20. In step S7, in accordance with the player switching notification from the remote control controller 24, the player selection controller 25 performs switching to one of the plurality of players controlled by the media player controller 20, the one being specified by the player switching notification. Specifically, the player selection controller 25 performs switching from Player A to Player B controlled by the media player controller 20 (step S26 of FIG. 4).

In step S8, after the player selection controller 25 starts performing switching to the specified player, the remote control controller 24 uses a clock circuit to set a timer to a predetermined period of time (step S27 of FIG. 4). Specifically, the timer is set to a predetermined period of time, such as 100 ms, defined in the AVRCP v1.4.

In step S9, the player selection controller 25 checks the success or failure of switching to the player specified by the player switching notification, and determines whether the success or failure of the player switching has been determined. If the player selection controller 25 determines in step S9 that the success or failure of switching to the player specified by the player switching notification has been determined (YES in step S9), the player selection controller 25 notifies the remote control controller 24 of the success or failure of the player switching. Then, in step S10, in accordance with the notification about the success or failure of the player switching, the remote control controller 24 generates a success response or a failure response to the player selection request, and causes the short-distance wireless communication unit 22 to transmit the generated success or failure response to the headset 2. Then, the process ends.

On the other hand, if the player selection controller 25 determines in step S9 that the success or failure of switching to the player specified by the player switching notification has not been determined (NO in step S9), the process proceeds to step S11. In step S11, the remote control controller 24 determines whether the set timer has expired (step S28 of FIG. 4). Before the success or failure of the player switching is determined, if the remote control controller 24 determines in step S11 that the set timer has expired (YES in step S11), the process proceeds to step S12. In step S12, although the success or failure of the player switching performed by the player selection controller 25 has not been determined, the remote control controller 24 generates a success response to the player selection request, and causes the short-distance wireless communication unit 22 to transmit the generated success response to the headset 2 (step S29 of FIG. 4). Here, the mobile phone 1 recognizes that the activated player is still Player A.

The short-distance wireless communication unit of the headset 2 receives, from the mobile phone 1, the success response to the player selection request (step S30 of FIG. 4). The headset 2 executes the application program and recognizes that switching from Player A to Player B has been made on the basis of the success response. If the remote control controller 24 determines in step S11 that the timer has not expired (NO in step S11), the process returns to step S9, and the following steps are repeated.

In step S13, the monitoring unit 26 monitors the result of the player switching executed, in accordance with the player selection request, by the player selection controller 25. Then, on the basis of a notification from Player A, which is a currently activated application program, the monitoring unit 26 determines whether the player switching has failed (step S31 of FIG. 4).

If the monitoring unit 26 determines in step S13 that the player switching has failed (YES in step S13), the monitoring unit 26 notifies the remote control controller 24 that the player switching has failed. In accordance with the failure notification from the monitoring unit 26, the remote control controller 24 generates a player change notification indicating a change from Player B to Player A. That is, although the success response transmitted to the headset 2 in step S12 indicates the success of switching from Player A to Player B, the player change notification indicates that the player is changed from Player B to Player A, which was selected before receipt of the player selection request. Then, in step 114, the remote control controller 24 causes the short-distance wireless communication unit 22 to transmit the generated player change notification to the headset 2 (step S32 of FIG. 4).

The short-distance wireless communication unit of the headset 2 receives the player change notification from the mobile phone 1. The headset 2 executes the application program to recognize, on the basis of the player change notification, that switching from Player B to Player A has been made (step S33 of FIG. 4). Thus, the player recognized by the mobile phone 1 as a currently selected player matches that recognized by the headset 2 as a currently selected player.

If the monitoring unit 26 determines in step S13 that player switching has been successful (NO in step S13), the process skips step S14.

As described above, if the mobile phone 1 having received a player selection request fails to determine the success or failure of player switching within a predetermined period of time, a player selection response indicating success of the player switching is transmitted to the headset 2. Therefore, the player selection response can be made within a predetermined period of time defined in the AVRCP v1.4. Moreover, after the player selection response indicating success of the player switching is transmitted to the headset 2, if it turns out that the player switching has failed, a player change notification indicating switching to a player selected before receipt of the player selection request is transmitted to the headset 2. Therefore, it is possible to avoid a mismatch in recognition between the mobile phone 1 and the headset 2.

For the mobile phone 1 to transmit a player selection response to the headset 2 within a predetermined period of time, the timer may be set to any period of time defined in the AVRCP v1.4. For example, the timer may be set to zero second. Setting the timer to zero second means that it is not necessary for the mobile phone 1 to have any timer. In this case, upon receipt of a player selection request from the headset 2, the mobile phone 1 executes player switching and transmits, to the headset 2, a player selection response indicating success of the player switching. Even when no timer is provided, if after the transmission of the player selection response indicating success of the player switching to the headset 2, the monitoring unit 26 detects failure of the player switching, a player change notification indicating that switching to the original player has been made is transmitted to the headset 2. Thus, it is possible to avoid a mismatch in recognition between the mobile phone 1 and the headset 2.

In the case of FIG. 3 and FIG. 4, Player A, which is one of the plurality of players controlled by the media player controller 20, is already activated in the mobile phone 1. However, the present invention is not limited to this. For example, the present invention is also applicable to the case where none of the plurality of players controlled by the media player controller 20 is activated in the mobile phone 1. In such a case, the mobile phone 1 receives a command when no player is activated, and transmits, to the headset 2, a player change notification indicating a change into a player (default player) determined in advance as a player that executes the received command. Hereinafter, the audio data transfer process performed using this method will be described. Here, the audio data transfer process performed in the mobile phone 1 is the same as that of FIG. 3, and thus its description will be omitted to avoid repetition.

Figure 5:
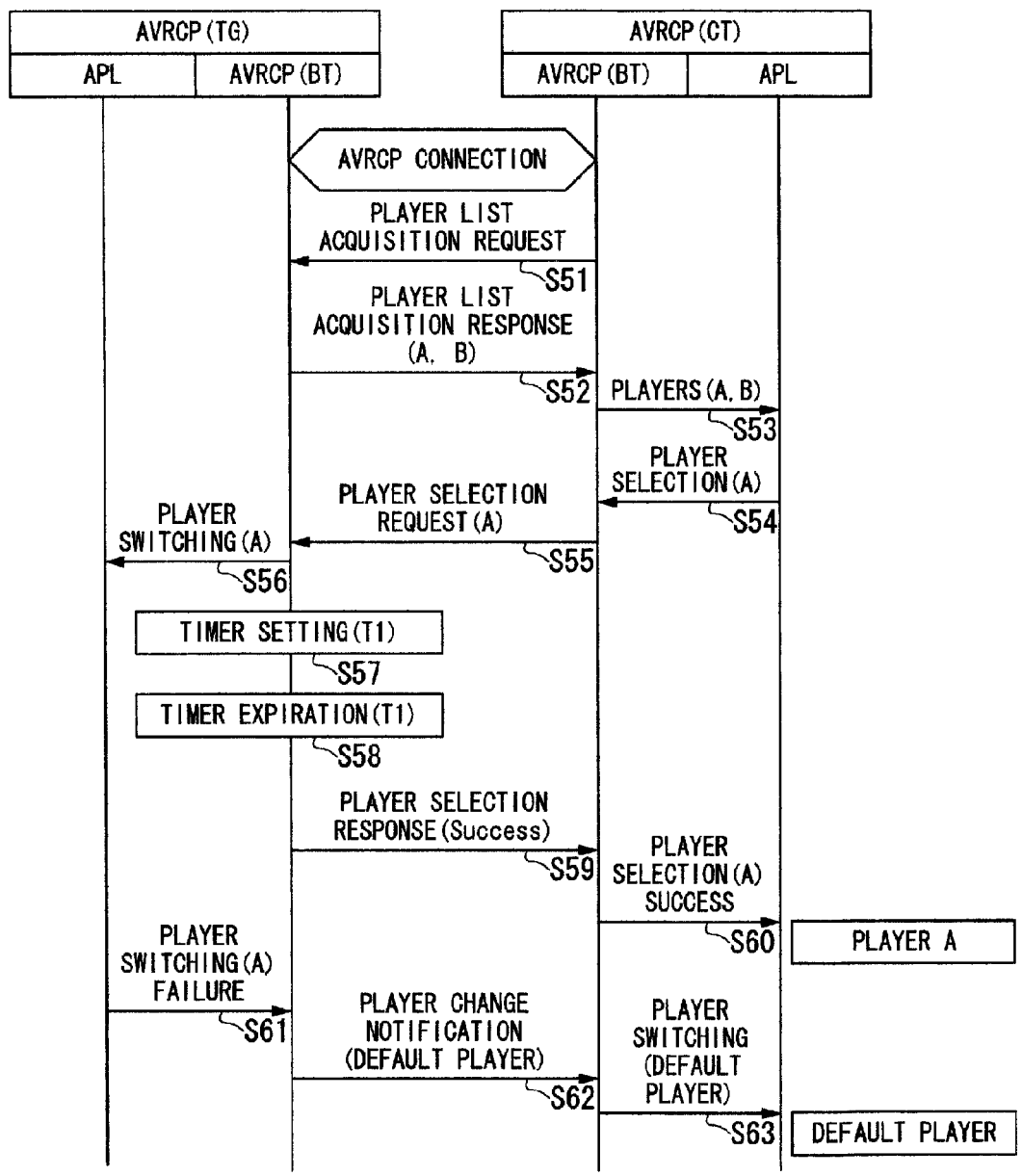
FIG. 5 illustrates another processing sequence performed between the mobile phone and the headset during execution of the audio data transfer process described with reference to FIG. 3.

FIG. 5 illustrates another processing sequence performed between the mobile phone 1 and the headset 2 during execution of the audio data transfer process described with reference to the flowchart of FIG. 3. In the case of FIG. 5, none of the plurality of players executed by the media player controller 20 is activated in the mobile phone 1.

The headset 2 transmits, through the short-distance wireless communication unit to the mobile phone 1, a player selection request to select Player A. At this point, since none of the players is activated in the mobile phone 1, the mobile phone 1 cannot activate Player A in accordance with the selection request from the headset 2.

Before the success or failure of the player switching is determined, if the remote control controller 24 determines in step S11 of FIG. 3 that the set timer has expired (YES in step S11), the process proceeds to step S12. In step S12, although the success or failure of the player switching performed by the player selection controller 25 has not be determined, the remote control controller 24 generates a success response to the player selection request, and causes the short-distance wireless communication unit 22 to transmit the generated success response to the headset 2 (step S59 of FIG. 5). Here, the mobile phone 1 recognizes that none of the players is activated.

The short-distance wireless communication unit of the headset 2 receives, from the mobile phone 1, the success response to the player selection request (step S60 of FIG. 5). The headset 2 executes the application program and recognizes that switching to Player A has been made on the basis of the success response. In step S13, the monitoring unit 26 monitors the result the player switching executed, in accordance with the player selection request, by the player selection controller 25. Then, on the basis of a notification from Player A, the monitoring unit 26 determines whether the player switching has failed (step S61 of FIG. 5). In the case of FIG. 5, since none of the plurality of players controlled by the media player controller 20 is activated in the mobile phone 1, the player selection request to select Player A cannot be accepted. Therefore, the monitoring unit 26 determines that the player switching has failed.

If the monitoring unit 26 determines in step S13 that the player switching has failed (YES in step S13), the monitoring unit 26 notifies the remote control controller 24 that the player switching has failed. In accordance with the failure notification from the monitoring unit 26, the remote control controller 24 generates a player change notification indicating a change from Player A to a default player. That is, although the success response transmitted to the headset 2 in step S12 indicates the success of switching to Player A, the player change notification indicates that the player is changed from Player A to the default player. Then, in step S14, the remote control controller 24 causes the short-distance wireless communication unit 22 to transmit the generated player change notification to the headset 2 (step S62 of FIG. 5).

The short-distance wireless communication unit of the headset 2 receives, from the mobile phone 1, a selection failure response and the player change notification. The headset 2 executes the application program and recognizes, on the basis of the player change notification, that the state where Player A is activated has been changed to the state where no player is activated (step S63 of FIG. 5).

According to the embodiments of the present invention, a selection request to select any of a plurality of players (e.g., a music player, a digital terrestrial one-segment player, etc.) is received from a partner device via short-distance wireless communication, and switching to a player that is requested to be selected is controlled in accordance with the received selection request. After start of the player switching, when a predetermined period of time elapses before success or failure of the player switching is determined, a selection success response to the selection request is transmitted to the partner device via short-distance wireless communication. After the transmission of the selection success response, when failure of the player switching is detected, a player change notification indicating a change into a player selected before execution of the player switching is transmitted to the partner device via short-distance wireless communication.

As described above, after a selection request is received, a selection success response can be temporarily transmitted to the headset 2 within a predetermined period of time defined in the AVRCP v1.4 standard. Even when player switching fails, a player change notification indicating a change into a player selected before execution of the player switching can be transmitted to the headset 2 later on. It is thus possible to avoid a mismatch where a player recognized by the mobile phone 1 differs from that recognized by the headset 2. Therefore, a response to a player selection request based on a remote control command can be properly transmitted to the partner device. Thus, the operation in the mobile phone 1 can be performed in accordance with the AVRCP v1.4 standard and, at the same time, in accordance with an appropriate procedure depending on the practical situation.

The present invention makes it possible to properly transmit, to a partner device, a response to a player selection request made using a remote control command.

Examples of the players controlled by the media player controller 20 include not only a music player and a digital terrestrial one-segment player, but also include various other players, such as players related to alarms and ringtones.

The present invention is applicable not only to the mobile phone 1, but also to other information processing apparatuses, such as a personal digital assistant (PDA), a personal computer, a portable game machine, a portable music player, and a portable video player.

The series of processes described in the embodiments of the present invention can be performed either by software or hardware.

In the embodiments of the present invention described above, the steps in the flowchart are performed sequentially in the described order. However, the steps may be performed simultaneously or individually, and do not necessarily have to be performed sequentially.

What is claimed is:

1. An information processing apparatus comprising:
a receiving unit configured to receive, from an electronic device via short-distance wireless communication, a selection request to select any of a plurality of players which the information processing apparatus controls;
a player switching control unit configured to control switching to a player requested to be selected, in accordance with the selection request received by the receiving unit; and
a selection success response transmitting unit configured to transmit, to the electronic device via short-distance wireless communication, a selection success response to the selection request if after the player switching control unit starts player switching, a predetermined time elapses before success or failure of the player switching is determined.

2. The information processing apparatus according to claim 1, further comprising a change notification unit configured to transmit a player change notification to the electronic device via short-distance wireless communication, the player change notification indicating a change into a state where a player selected before the player switching control unit controls the player switching is selected, if failure of the player switching performed by the player switching control unit is detected after the selection success response transmitting unit transmits the selection success response to the electronic device.

3. The information. processing apparatus according to claim 2, wherein in a case where none of the plurality of players is activated, if the receiving unit receives a selection request to select any of the plurality of players, the player indicated by the player change notification transmitted by the change notification unit is a default player set as a player that receives and executes a command if none of the plurality of players is activated.

4. The information processing apparatus according to claim 1, wherein the plurality of players include at least a music player and a digital terrestrial player.

5. The information processing apparatus according to claim 1, further comprising a setting unit configured to set a timer to a predetermined time, after the player switching control unit starts the player switching.

6. The information processing apparatus according to claim 5, wherein the predetermined time to which the setting unit sets the timer is within a time which is defined in the AVRCPv1.4 as a time until the selection response to the selection request is transmitted to the electronic device.

7. An information process apparatus comprising:
a receiving unit configured to receive, from a electronic device via short-distance wireless communication, a selection request to select any of a plurality of players which the information processing apparatus controls;

a player switching control unit configured to control, if the receiving unit receives a selection request to select a second player of the plurality of players while a first player of the plurality of players is activated, switching to the second player requested to be selected;

a selection success response transmitting unit configured to transmit, to the electronic device via short-distance wireless communication, a selection success response indicating success of switching to the second player to the selection request if after the player switching control unit starts switching from the first player to the second player, a predetermined time elapses before success or failure of the switching is detected; and a change notification unit configured to transmit a player change notification to the electronic device via short-distance wireless communication, the player change notification indicating a change into a state where the first player is selected, if failure of the switching to the second player performed by the player switching control unit is detected after the selection success response transmitting unit transmits to the electronic device the selection success response indicating success of the switching to the second player.

8. The information processing apparatus according to claim 7, wherein in a case where none of the plurality of players is activated, if the receiving unit receives a selection request to select any of the plurality of players, the player indicated by the player change notification transmitted by the change notification unit is a default player set as a player which receives and executes a command if none of the plurality of players is activated.

9. The information processing apparatus according to claim 7, wherein the plurality of players include at least a music player and a digital terrestrial player.

10. The information processing apparatus according to claim 7, further comprising a setting unit configured to set a timer to a predetermined time, after the player switching control unit starts the player switching.

11. The information processing apparatus according to claim 10, wherein the predetermined time to which the setting unit sets the timer is within a time which is defined in the AVRCPv1.4 as a time until the selection response to the selection request is transmitted to the electronic device.

12. An information processing apparatus comprising:

a receiving unit configured to receive, from a electronic device via short-distance wireless communication, a selection request to select any of a plurality of players which the information processing apparatus controls;

a player switching control unit configured to control switching to a player requested to be selected, in accordance with the selection request received by the receiving unit;

a selection success response transmitting unit configured to transmit, to the electronic device via short-distance wireless communication, a selection. success response to the selection request if the player switching control unit starts player switching, the selection success response indicating success of the player switching; and a change notification unit configured to transmit a player change notification to the electronic device via short-distance wireless communication, the player change notification indicating a change into a state where a player selected before the player switching control unit controls the player switching is selected, if failure of the player switching performed by the player switching control unit is detected after the selection success response transmitting unit transmits the selection success response to the electronic device.

13. The information processing apparatus according to claim 12, wherein the plurality of players include at least a music player and a digital terrestrial player.

14. The information processing apparatus according to claim 12, further comprising a setting unit configured to set a timer to a predetermined time, after the player switching control unit starts the player switching.

15. The information processing apparatus according to claim 14, wherein the predetermined time to which the setting unit sets the timer is within a time which is defined in the AVRCPv1.4 as a time until the selection response to the selection request is transmitted to the electronic device.

* * * * *